United States Patent [19]

Seiler

[11] Patent Number: 4,545,785
[45] Date of Patent: Oct. 8, 1985

[54] REACTIVE DYES, PROCESS FOR THEIR PREPARATION AND THE USE THEREOF

[75] Inventor: Herbert Seiler, Riehen, Switzerland

[73] Assignee: Ciba-Geigy Corporation, Ardsley, N.Y.

[21] Appl. No.: 598,566

[22] Filed: Apr. 10, 1984

[30] Foreign Application Priority Data

Apr. 15, 1983 [CH] Switzerland ............... 2039/83

[51] Int. Cl.⁴ ............... C09B 62/08; D06P 3/66; D06P 1/38
[52] U.S. Cl. ............... 8/549; 8/682; 8/688; 8/696; 8/918
[58] Field of Search ............... 8/549; 260/153

[56] References Cited

U.S. PATENT DOCUMENTS 4,261,889  4/1981  Seiler et al. ............... 260/153
4,474,697  10/1984  Wunderlich et al. ............... 260/153

FOREIGN PATENT DOCUMENTS 43927    1/1982  European Pat. Off.
2009775  6/1979  United Kingdom

OTHER PUBLICATIONS

Chemical Abstract 96, 144462g, (1982).

Primary Examiner—A. Lionel Clingman
Attorney, Agent, or Firm—Edward McC. Roberts; Kevin T. Mansfield

[57] ABSTRACT

Reactive dyes of the formula

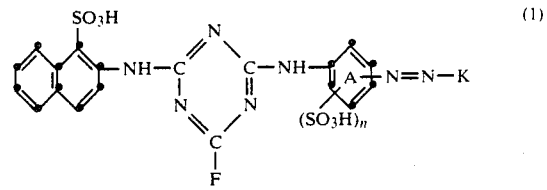

wherein K is the radical of a naphtholsulfonic acid or N-acylated aminonaphtholsulfonic acid, n is 1 or 2 and the benzene ring A may contain further substituents, are suitable for dyeing or printing cellulosic fibre materials and afford dyeings or prints with good fastness properties.

12 Claims, No Drawings

REACTIVE DYES, PROCESS FOR THEIR PREPARATION AND THE USE THEREOF

The present invention relates to novel reactive dyes, to a process for their preparation, and to the use thereof for dyeing and printing fibre materials.

Specifically, the invention relates to reactive dyes of the formula

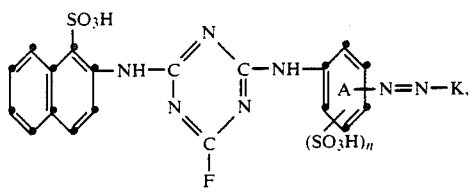

wherein K is the radical of a naphtholsulfonic acid or N-acylated aminonaphtholsulfonic acid, n is 1 or 2, and the benzene ring A may contain further substituents.

Preferred reactive dyes of the formula (1) are those wherein K is the radical of a hydroxynaphthalenedisulfonic acid or of an N-acylated aminohydroxynaphthalene-mono- or -disulfonic acid.

The most preferred reactive dyes of the formula (1) are those wherein K is the radical of an N-acylated 1-amino-8-hydroxynaphthalene-3,6- or -4,6-disulfonic acid.

Possible further substituents at the benzene ring A are in particular $C_1$-$C_4$alkyl, $C_1$-$C_4$alkoxy, halogen and carboxyl, with preferred substituents being methyl, ethyl, methoxy, ethoxy, chlorine and carboxyl.

Further preferred reactive dyes of the formula (1) are those wherein n is 1 and the benzene ring A does not contain further substituents.

The reactive dye of the formula

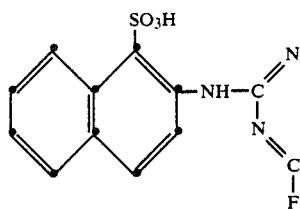 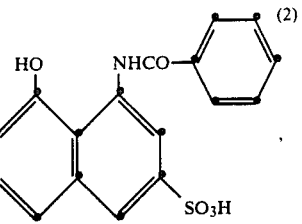

constitutes an important embodiment of the invention.

The present invention also relates to a process for the preparation of reactive dyes of the formula (1), which comprises diazotising, coupling and condensing, in appropriate order, 2-naphthylamine-1-sulfonic acid, 2,4,6-trifluoro-s-triazine, a phenylenediaminesulfonic acid and a coupling component of the naphtholsulfonic acid or N-acylated aminonaphtholsulfonic acid series.

If necessary, the corresponding aminoacetylamino compound is used instead of a phenylenediaminesulfonic acid and the acetyl group is removed by saponification after diazotisation and coupling.

As the individual process steps referred to above may be carried out in varying sequence, different variants of the process are possible. The starting materials to be used for each partial reaction can be inferred from formula (1). In general, the reaction is carried out stepwise in succession and the order in which the simple reactions of the individual reactants are carried out may be freely chosen. Which of the possible process variants give the best results or under which special conditions, e.g. at what condensation temperature, the reaction shall most conveniently be carried out, depends on the structure of the starting materials.

Important process variants comprise:

1. condensing 2,4,6-trifluoro-s-triazine with 2-naphthylamine-1-sulfonic acid, condensing the monocondensation product with a phenylenediaminesulfonic acid, diazotising the obtained secondary condensation product and coupling to a coupling component;

2. diazotising a phenylenediaminesulfonic acid or a corresponding aminoacetylamino compound and coupling to a coupling component and, if necessary, removing the acetyl radical by saponification, condensing the azo compound with 2,4,6-trifluoro-s-triazine and condensing the obtained monocondensation product with 2-naphthylamine-1-sulfonic acid;

3. condensing a phenylenediaminesulfonic acid with 2,4,6-trifluoro-s-triazine, condensing the primary condensation product with 2-naphthylamine-1-sulfonic acid, diazotising the obtained secondary condensation product and coupling to a coupling component;

4. diazotising a phenylenediaminesulfonic acid or a corresponding aminoacetylamino compound and coupling to a coupling component and, if necessary, removing the acetyl radical by saponification, further condensing 2,4,6-trifluoro-s-triazine with 2-naphthylamine-1-sulfonic acid and condensing both intermediates with each other, 5. condensing 2,4,6-trifluoro-s-triazine with a phenylenediaminesulfonic acid, diazotising the obtained primary condensation product and coupling to a coupling component, and finally replacing a fluorine atom in the s-triazine radical with the corresponding radical by condensation with 2-naphthylamine-1-sulfonic acid.

A preferred embodiment of the process for the preparation of reactive dyes of the formula (1) comprises carrying out the condensation reactions and, if desired, the coupling, in the presence of at least the equimolar amount of a basic lithium compound.

Preferred basic lithium compounds are lithium carbonate, lithium hydrogen carbonate or lithium hydroxide.

Accordingly, it is preferred to carry out the condensation or coupling reactions in the process variants 1. to 5. described above in the presence of basic lithium compounds.

The preferred mode of preparing the reactive dyes of formula (2) comprises condensing 2-naphthylamine-1-sulfonic acid with 2,4,6-trifluoro-s-triazine in the presence of lithium hydroxide, condensing the condensation product with 1,3-diamino-benzene-4-sulfonic acid in the presence of lithium hydroxide, diazotising the obtained secondary condensation product, and coupling with 1-benzoylamino-8-hydroxynaphthalene-3,6-disulfonic acid in the presence of lithium hydroxide or sodium hydroxide.

Examples of starting compounds which may be used for the preparation of the reactive dyes of the formula (1) are:

(a) 2-naphthylamine-1-sulfonic acid;
(b) 2,4,6-trifluoro-s-triazine (cyanuric fluoride);
(c) phenylenediaminesulfonic acids:
1-amino-3-acetylaminobenzene-4-sulfonic acid (subsequently saponified),
1-amino-3-acetylaminobenzene-6-sulfonic acid (subsequently saponified),
1-amino-3-acetylamino-4-methylbenzene-6-sulfonic acid (subsequently saponified),
1-amino-4-acetylaminobenzene-2-sulfonic acid (subsequently saponified),
1-amino-3-acetylamino-6-methylbenzene-4-sulfonic acid (subsequently saponified),
1-amino-3-acetylamino-6-methoxybenzene-4-sulfonic acid (subsequently saponified),
1,4-diaminobenzene-2-sulfonic acid,
1,4-diaminobenzene-2,5-disulfonic acid,
1,4-diaminobenzene-2,6-disulfonic acid,
1,3-diaminobenzene-4-sulfonic acid,
1,3-diaminobenzene-4,6-disulfonic acid,
1,4-diamino-2-chlorobenzene-5-sulfonic acid,
1,4-diamino-2-methylbenzene-5-sulfonic acid,
1,5-diamino-6-methylbenzene-3-sulfonic acid,
1,3-diamino-6-methylbenzene-4-sulfonic acid,
1,4-diamino-6-chlorobenzene-2-sulfonic acid;

(d) coupling components:
2-hydroxynaphthalene-6- or -7-sulfonic acid,
2-hydroxynaphthalene-3,6- or -6,8-disulfonic acid,
1-hydroxynaphthalene-4-sulfonic acid, 1-hydroxynaphthalene-4,6- or -4,7-disulfonic acid, 1-acetylamino-8-hydroxynaphthalene-6-sulfonic acid, 1-acetylamino-8-hydroxynaphthalene-2,4-disulfonic acid,
1-benzoylamino-8-hydroxynaphthalene-3,6- or -4,6-disulfonic acid,
2-benzoylamino-5-hydroxynaphthalene-7-sulfonic acid,
2-(N-acetyl-N-methylamino)-5-hydroxynaphthalene-7-sulfonic acid,
2-acetylamino-5-hydroxynaphthalene-7-sulfonic acid,
2-acetylamino-5-hydroxynaphthalene-1,7-disulfonic acid,
2-(N-acetyl-N-methylamino)-8-hydroxynaphthalene-6-sulfonic acid,
2-acetylamino-8-hydroxynaphthalene-6-sulfonic acid,
2-acetylamino-8-hydroxynaphthalene-3,6-disulfonic acid,
1-acetylamino-5-hydroxynaphthalene-7-sulfonic acid,
1-acetylamino-8-hydroxynaphthalene-3,6- or -4,6-disulfonic acid,
2-sulfoacetylamino-5-hydroxynaphthalene-7-sulfonic acid,
2-ureido-5-hydroxynaphthalene-7-sulfonic acid,
1-hydroxynaphthalene-3,6-disulfonic acid,
1-methoxyacetylamino-8-hydroxynaphthalene-3,6-disulfonic acid,
1-sulfoacetylamino-8-hydroxynaphthalene-3,6- or -4,6-disulfonic acid, 1-chloroacetylamino-8-hydroxynaphthalene-3,6-disulfonic acid,
1-acryloylamino-8-hydroxynaphthalene-3,6-disulfonic acid,
1-propionylamino-8-hydroxynaphthalene-4,6-disulfonic acid,
1-phenylureido-8-hydroxynaphthalene-3,6-disulfonic acid,
1-(3'-chlorobenzoylamino)-8-hydroxynaphthalene-3,6-disulfonic acid,
1-(4'-methylbenzoylamino)-8-hydroxynaphthalene-3,6-disulfonic acid,
1-crotonylamino-8-hydroxynaphthalene-4,6-disulfonic acid,
1-ureido-8-hydroxynaphthalene-4,6-disulfonic acid,
1-(2',4'-dichlorobenzoylamino)-8-hydroxynaphthalene-4,6-disulfonic acid, 1-ureido-8-hydroxynaphthalene-3,6-disulfonic acid,
1-propionylamino-8-hydroxynaphthalene-3,6-disulfonic acid,
1-($\beta$-chloropropionylamino)-8-hydroxynaphthalene-3,6-disulfonic acid,
1-crotonylamino-8-hydroxynaphthalene-3,6-disulfonic acid,
1-chloroacetylamino-8-hydroxynaphthalene-4,6-disulfonic acid,
1-(4'-chlorobenzoylamino)-8-hydroxynaphthalene-3,6-disulfonic acid,
1-(3'-methylbenzoylamino)-8-hydroxynaphthalene-3,6-disulfonic acid,
1-($\beta$-chloropropionylamino)-8-hydroxynaphthalene-4,6-disulfonic acid.

The diazotisation of the phenylenediaminesulfonic acids is normally carried out by treatment with nitrous acid in an aqueous solution of mineral acid at low temperature, and the coupling to the coupling components is carried out at weakly acid, neutral to weakly alkaline pH values.

The condensation reactions of the 2,4,6-trifluoro-s-triazine with the phenylenediaminesulfonic acids or, if coupling is carried out first, with the aminoazo compounds, are preferably conducted in aqueous solution or suspension, at low or normal temperature, and at weakly acid, neutral to weakly alkaline pH value. Hydrogen fluoride evolved during the condensation is conveniently neutralised by the continuous addition of an aqueous alkali metal hydroxide, carbonate or bicarbonate. The condensation of the 2,4,6-trifluoro-s-triazine with the 2-naphthylamine-1-sulfonic acid is carried out at pH 7 and 0° C. and the subsequent condensation with the phenylenediaminesulfonic acid at pH 8 and in the temperature range from 0° to 20° C. If the starting material is the aminoazo dye, condensation with 2,4,6-trifluoro-s-triazine is carried out at pH 6.5 to 7 and 0° C., and the condensation with the 2-naphthylamine-1-sulfonic acid in the final step is carried out at pH 7 and in the normal temperature range up to about 30° C. In this case too it is convenient to neutralise the hydrogen fluoride evolved during the reaction by continuously adding an aqueous alkali metal hydroxide, carbonate or bicarbonate. Examples of suitable alkaline compounds are sodium hydroxide, sodium carbonate, sodium hydrogen carbonate and the corresponding potassium or lithium salts.

In the preferred embodiment of the process for the preparation of the reactive dyes of the formula (1), basic lithium compounds are employed as alkaline compounds in the condensation or coupling reactions or to neutralise the hydrogen fluoride evolved, respectively. It is preferred to carry out both condensation reactions and, if desired, also the coupling reaction, in the presence of at least the equimolar amount of a basic lithium compound. The basic lithium compound is used in the condensation or coupling reactions in 1 to 3, preferably 1.2 to 1.5, molar amounts. Afterwards the reactive dyes of the formula (1) are obtained in aqueous phase—dependent on the nature and amount of the salts added—in the form of lithium salts or of a mixture of lithium salts with other alkali metal salts such as sodium or potassium salts. They can be precipitated from the aqueous solution by addition of sodium or potassium salts, e.g. with sodium chloride.

Further, the dye salts can be isolated direct from the aqueous solution by spray drying or cylinder drying. In addition, the aqueous solutions of dye salts obtained by the process of this invention can be used direct as liquid formulations, optionally after addition of a buffer, preferably a phosphate buffer (pH 5.5 to 6.5). This preferred embodiment of the process for the preparation of reactive dyes of the formula (1) facilitates the working up of the reaction products, which are obtained pure and substantially free from troublesome by-products.

The dyes of the formula (1) are fibre-reactive, as they contain a removable fluorine atom in the s-triazine radical. Fibre-reactive compounds will be understood as meaning those compounds which are able to react with the hydroxyl groups of cellulose or with the amino groups of natural or synthetic polyamides to form covalent chemical bonds.

The reactive dyes of the formula (1) and their salts are suitable for dyeing and printing a very wide range of materials such as silk, leather, wool, polyamide fibres and polyurethanes, and especially cellulosic materials of fibrous structure such as linen, cellulose, regenerated cellulose and, most particularly, cotton. They are suitable for the exhaust process, especially at elevated temperature, and also for dyeing by the pad-dyeing process, in which the goods are impregnated with aqueous and, if appropriate, also with salt-containing dye solutions, and the dyes are fixed after treatment with an alkali, or in the presence of an alkali, with or without the application of heat. The dyes of formula (1) are also suitable for printing, especially on cotton, and also for printing nitrogen-containing fibres, e.g. wool, silk or blends containing wool. It is advisable to rinse the dyeings and prints thoroughly with cold and hot water, if appropriate with the addition of an agent which acts as a dispersant and promotes diffusion of non-fixed dye.

The reactive dyes of the formula (1) are distinguished by high reactivity and good fixation. They produce dyeings of good light-and wetfastness properties and with high tinctorial strength and high fibre-dye bond stability both in the acid and in the alkaline range. The dyeings are dischargeable.

The following examples serve to illustrate the invention. The temperatures are given in degrees centigrade. The parts and percentages are by weight, unless stated otherwise. Parts by weight relate to parts by volume as the kilogram relates to the liter.

The production of the intermediates is not described in all of the following Examples. However, any undisclosed production is clearly evident from what has been stated above.

EXAMPLE 1

22.3 g of 2-naphthylamine-1-sulfonic acid are stirred in 350 ml of water to form a neutral solution after addition of 50 ml of 2N lithium hydroxide solution at room temperature. The solution is buffered with 0.4 g of disodium phosphate and the pH rises to 8.3. Then 14.2 g of 2,4,6-trifluoro-1,3,5-triazine are added dropwise at 0° C. over 10 minutes, while keeping the pH at 7 with 2N lithium hydroxide solution. As soon as no further consumption of alkali can be detected, a solution of 17.8 g of 1,3-diaminobenzene-4-sulfonic acid in 60 ml of 2N lithium hydroxide is added to the reaction mixture at 0°-5° C. at pH 8.5 over the course of 5 to 10 minutes. The reaction mixture is stirred initially for 1 hour at 0° to 5° C. and then the temperature is allowed to rise to 20° C., while adding a further 35 ml of 2N lithium hydroxide solution to neutralise the hydrogen fluoride evolved. The reaction solution of the secondary condensation product of 2,4,6-trifluoro-1,3,5-triazine, 2-naphthylamine-1-sulfonic acid and 1,3-diaminobenzene-4-sulfonic acid is cooled to 0°-5° C., then 23 ml of 4N sodium nitrite solution are added, followed by the addition of 25 ml of concentrated hydrochloric acid, and diazotisation is carried out for 1 hour. To the suspension of the diazo compound are added 39.7 g of 1-benzoylamino-8-hydroxynaphthalene-3,6-disulfonic acid and the coupling is carried out by adding 2N lithium hydroxide solution dropwise at pH 8. When the coupling is complete, the dye of the formula

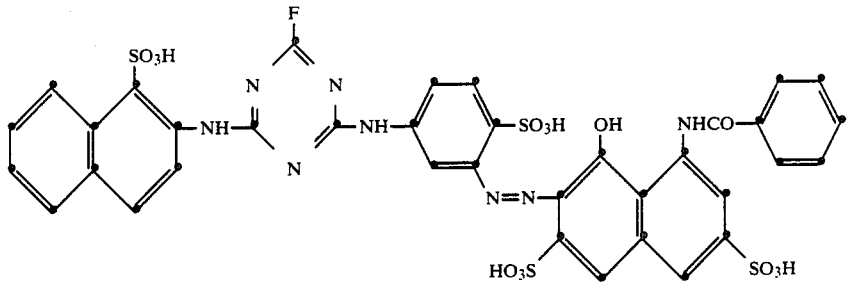

is precipitated with sodium chloride, filtered with suction, dried and ground. The dark powder so obtained is most suitable for dyeing cotton in brilliant red shades by the methods commonly employed for dyeing with reactive dyes.

Dyes with similar properties are obtained by using equivalent amounts of the components listed in Table 1 instead of the compounds employed in this Example and otherwise carrying out the procedure described above.

The dye described in this Example can also be prepared via the dye chromophore, although not in such straightforward manner, by condensing 1-benzoylamino-7-(3'-amino-6'-sulfophenylazo)-8-hydroxynaphthalene-3,6-disulfonic acid (obtained by diazotising and coupling 1-actylamino-3-aminobenzene-4-sulfonic acid to 1-benzoylamino-8-hydroxynaphthalene-3,6-disulfonic acid and subsequently saponifying the acetylamino group in acid medium) at 0° C. and pH 7 with 2,4,6-trifluoro-1,3,5-triazine and condensing the primary condensation product at 20°–30° C. with 2-naphthylamine-1-sulfonic acid

TABLE 1

| No. | Diamine | Coupling component | Shade |
|---|---|---|---|
| 2 | 1,3-diaminobenzene-4-sulfonic acid | 1-acetylamino-8-hydroxynaphthalene-3,6-disulfonic acid | red |
| 3 | 1,3-diaminobenzene-4-sulfonic acid | 1-acetylamino-8-hydroxynaphthalene-4,6-disulfonic acid | red |
| 4 | 1,3-diaminobenzene-4-sulfonic acid | 1-benzoylamino-8-hydroxynaphthalene-4,6-disulfonic acid | red |
| 5 | 1,3-diaminobenzene-4-sulfonic acid | 2-acetylamino-5-hydroxynaphthalene-7-sulfonic acid | orange |
| 6 | 1,3-diaminobenzene-4-sulfonic acid | 2-sulfoacetylamino-5-hydroxynaphthalene-7-sulfonic acid | orange |
| 7 | 1,3-diaminobenzene-4-sulfonic acid | 2-ureido-5-hydroxynaphthalene-7-sulfonic acid | orange |
| 8 | 1,3-diaminobenzene-4-sulfonic acid | 2-acetylamino-8-hydroxynaphthalene-6-sulfonic acid | red |
| 9 | 1,3-diaminobenzene-4-sulfonic acid | 2-hydroxynaphthalene-3,6-disulfonic acid | reddish orange |
| 10 | 1,3-diaminobenzene-4-sulfonic acid | 2-hydroxynaphthalene-6,8-disulfonic acid | orange |
| 11 | 1,3-diaminobenzene-4-sulfonic acid | 1-hydroxynaphthalene-3,6-disulfonic acid | reddish orange |
| 12 | 1,3-diaminobenzene-4-sulfonic acid | 1-hydroxynaphthalene-4,6-disulfonic acid | reddish orange |
| 13 | 1,4-diaminobenzene-2-sulfonic acid | 1-acetylamino-8-hydroxynaphthalene-3,6-disulfonic acid | violet |
| 14 | 1,4-diaminobenzene-2-sulfonic acid | 1-benzoylamino-8-hydroxynaphthalene-3,6-disulfonic acid | violet |
| 15 | 1,4-diaminobenzene-2-sulfonic acid | 1-acetylamino-8-hydroxynaphthalene-4,6-disulfonic acid | bluish red |
| 16 | 1,4-diaminobenzene-2-sulfonic acid | 2-acetylamino-5-hydroxynaphthalene-7-sulfonic acid | scarlet |
| 17 | 1,4-diaminobenzene-2-sulfonic acid | 2-sulfoacetylamino-5-hydroxynaphthalene-7-sulfonic acid | scarlet |
| 18 | 1,4-diaminobenzene-2-sulfonic acid | 2-acetylamino-8-hydroxynaphthalene-6-sulfonic acid | bluish red |
| 19 | 1,4-diaminobenzene-2-sulfonic acid | 1-acetylamino-5-hydroxynaphthalene-7-sulfonic acid | red |
| 20 | 1,4-diaminobenzene-2-sulfonic acid | 2-hydroxynaphthalene-3,6-disulfonic acid | bluish red |
| 21 | 1,4-diaminobenzene-2-sulfonic acid | 2-hydroxynaphthalene-6,8-disulfonic acid | red |
| 22 | 1,4-diaminobenzene-2-sulfonic acid | 1-hydroxynaphthalene-3,6-disulfonic acid | red |
| 23 | 1,4-diaminobenzene-2-sulfonic acid | 1-hydroxy-7-(3'-sulfophenylamino)naphthalene-3-disulfonic acid | brown |
| 24 | 1,3-diaminobenzene-4-sulfonic acid | 1-sulfoacetylamino-8-hydroxynaphthalene-3,6-disulfonic acid | red |
| 25 | 1,3-diaminobenzene-4-sulfonic acid | 1-ureido-8-hydroxynaphthalene-3,6-disulfonic acid | red |
| 26 | 1,3-diaminobenzene-4-sulfonic acid | 1-propionylamino-8-hydroxynaphthalene-3,6-disulfonic acid | red |
| 27 | 1,3-diaminobenzene-4-sulfonic acid | 1-(β-chloropropionylamino)-8-hydroxynaphthalene-3,6-disulfonic acid | red |
| 28 | 1,3-diaminobenzene-4-sulfonic acid | 1-chloroacetylamino-8-hydroxynaphthalin-3,6-disulfonic acid | red |
| 29 | 1,3-diaminobenzene-4-sulfonic acid | 1-crotonylamino-8-hydroxynaphthalene-3,6-disulfonic acid | red |
| 30 | 1,3-diaminobenzene-4-sulfonic acid | 1-sulfoacetylamino-8-hydroxynaphthalene-4,6-disulfonic acid | red |
| 31 | 1,3-diaminobenzene-4-sulfonic acid | 1-ureido-8-hydroxynaphthalene-4,6-disulfonic acid | red |
| 32 | 1,3-diaminobenzene-4-sulfonic acid | 1-chloroacetylamino-8-hydroxynaphthalene-4,6-disulfonic acid | red |
| 33 | 1,3-diaminobenzene-4,6-disulfonic acid | 2-acetylamino-5-hydroxynaphthalene-7-sulfonic acid | orange |
| 34 | 1,3-diaminobenzene-4,6-disulfonic acid | 2-ureido-5-hydroxynaphthalene-7-sulfonic acid | orange |
| 35 | 1,3-diaminobenzene-4,6-disulfonic acid | 2-acetylamino-8-hydroxynaphthalene-6-sulfonic acid | red |
| 36 | 1,3-diaminobenzene-4,6-disulfonic acid | 1-acetylamino-8-hydroxynaphthalene-3,6-disulfonic acid | red |
| 38 | 1,3-diaminobenzene-4,6-disulfonic acid | 1-ureido-8-hydroxynaphthalene-3,6-disulfonic acid | red |
| 39 | 1,3-diaminobenzene-4,6-disulfonic acid | 1-sulfoacetylamino-8-hydroxynaphthalene-3,6-disulfonic acid | red |
| 40 | 1,3-diaminobenzene-4,6-disulfonic acid | 1-methoxyacetylamino-8-hydroxynaphthalene-3,6-disulfonic acid | red |
| 41 | 1,3-diaminobenzene-4,6-disulfonic acid | 1-(4'-chlorobenzoylamino)-8-hydroxynaphthalene-3,6-disulfonic acid | red |
| 42 | 1,3-diaminobenzene-4,6-disulfonic acid | 1-(3'-methylbenzoylamino)-8-hydroxynaphthalene-3,6 disulfonic acid | red |
| 43 | 1,3-diaminobenzene-4,6-disulfonic acid | 1-acetylamino-8-hydroxynaphthalene-4,6-disulfonic acid | red |
| 44 | 1,3-diaminobenzene-4,6-disulfonic acid | 1-benzoylamino-8-hydroxynaphthalene-4,6-disulfonic acid | red |
| 45 | 1,3-diaminobenzene-4,6-disulfonic acid | 1-(β-chloropropionylamino)-8-hydroxynaphthalene-4,6-disulfonic acid | red |
| 46 | 1,3-diaminobenzene-4,6-disulfonic acid | 1-ureido-8-hydroxynaphthalene-4,6-disulfonic acid | red |
| 47 | 1,3-diaminobenzene-4,6-disulfonic acid | 2-hydroxynaphthalene-3,6-disulfonic acid | reddish orange |
| 48 | 1,3-diaminobenzene-4,6-disulfonic acid | 2-hydroxynaphthalene-6,8-disulfonic acid | orange |
| 49 | 1,3-diaminobenzene-4,6-disulfonic acid | 1-hydroxynaphthalene-3,6-disulfonic acid | reddish orange |
| 50 | 1,3-diaminobenzene-4,6-disulfonic acid | 1-hydroxynaphthalene-4,6-disulfonic acid | reddish orange |
| 51 | 1,4-diaminobenzene-2-sulfonic acid | 1-methoxyacetylamino-8-hydroxynaphthalene- | violet |

TABLE 1-continued

| No. | Diamine | Coupling component | Shade |
|---|---|---|---|
| 52 | 1,4-diaminobenzene-2-sulfonic acid | 3,6-disulfonic acid<br>1-sulfoacetylamino-8-hydroxynaphthalene-3,6-disulfonic acid | violet |
| 53 | 1,4-diaminobenzene-2-sulfonic acid | 1-chloroacetylamino-8-hydroxynaphthalene-3,6-disulfonic acid | violet |
| 54 | 1,4-diaminobenzene-2-sulfonic acid | 1-acryloylamino-8-hydroxynaphthalene-3,6-disulfonic acid | violet |
| 55 | 1,4-diaminobenzene-2-sulfonic acid | 1-sulfoacetylamino-8-hydroxynaphthalene-4,6-disulfonic acid | bluish red |
| 56 | 1,4-diaminobenzene-2-sulfonic acid | 1-propionylamino-8-hydroxynaphthalene-4,6-disulfonic acid | bluish red |
| 57 | 1,4-diaminobenzene-2,6-disulfonic acid | 1-acetylamino-8-hydroxynaphthalene-3,6-disulfonic acid | violet |
| 58 | 1,4-diaminobenzene-2,6-disulfonic acid | 1-benzoylamino-8-hydroxynaphthalene-3,6-disulfonic acid | violet |
| 59 | 1,4-diaminobenzene-2,6-disulfonic acid | 1-suloacetylamino-8-hydroxynaphthalene-3,6-disulfonic acid | violet |
| 60 | 1,4-diaminobenzene-2,6-disulfonic acid | 1-phenylureido-8-hydroxynaphthalene-3,6-disulfonic acid | violet |
| 61 | 1,4-diaminobenzene-2,6-disulfonic acid | 1-(3'-chlorobenzoylamino)-8-hydroxynaphthalene-3,6-disulfonic acid | violet |
| 62 | 1,4-diaminobenzene-2,6-disulfonic acid | 1-(4'-methylbenzoylamino)-8-hydroxynaphthalene-3,6-disulfonic acid | violet |
| 63 | 1,4-diaminobenzene-2,6-disulfonic acid | 1-acetylamino-8-hydroxynaphthalene-4,6-disulfonic acid | bluish red |
| 64 | 1,4-diaminobenzene-2,6-disulfonic acid | 1-benzoylamino-8-hydroxynaphthalene-4,6-disulfonic acid | bluish red |
| 65 | 1,4-diaminobenzene-2,6-disulfonic acid | 1-crotonylamino-8-hydroxynaphthalene-4,6-disulfonic acid | bluish red |
| 66 | 1,4-diaminobenzene-2,6-disulfonic acid | 1-ureido-8-hydroxynaphthalene-4,6-disulfonic acid | bluish red |
| 67 | 1,4-diaminobenzene-2,6-disulfonic acid | 1-(2',4'-dichlorobenzoylamino)-8-hydroxynaphthalene-4,6-disulfonic acid | bluish red |
| 68 | 1,4-diaminobenzene-2,6-disulfonic acid | 2-hydroxynaphthalene-3,6-disulfonic acid | bluish red |
| 69 | 1,4-diaminobenzene-2,6-disulfonic acid | 1-hydroxynaphthalene-3,6-disulfonic acid | red |

DYEING PROCEDURE I 2 parts of the reactive dye obtained in example 1 are dissolved in 400 parts of water. To this solution are added 1500 parts of a solution which contains 53 g/l of sodium chloride. 100 parts of cotton fabric are put into this dyebath at 40° C. and, after 45 minutes, 100 parts of a solution containing 16 g/l of sodium hydroxide and 20 g/l of calcined sodium carbonate are added. The temperature of the dyebath is kept for another 45 minutes at 40° C. The dyed goods are then rinsed, soaped at the boil for a quarter of an hour with a non-ionic detergent, rinsed again and dried.

DYEING PROCEDURE II 2 parts of the reactive dye employed in Example 1 are dissolved in 400 parts of water. To this solution are added 1500 parts of a solution which contains 53 g/l of sodium chloride. 100 parts of cotton fabric are put into this dyebath at 35° C., and after 20 minutes 100 parts of a solution containing 16 g/l of sodium hydroxide and 20 g/l of calcined sodium carbonate are added. The temperature of the dyebath is kept for another 15 minutes at 35° C. Then the temperature is raised to 60° C. over 20 minutes and kept at 60° C. for another 35 minutes. The dyed goods are then rinsed, soaped at the boil for a quarter of an hour with a non-ionic detergent, rinsed again and dried.

DYEING PROCEDURE III 4 parts of the reactive dye employed in Example 1 are dissolved in 50 parts of water. To this solution are added 50 parts of a solution which contains 5 g/l of sodium hydroxide and 20 g/l of calcined sodium carbonate. A cotton fabric is padded with this liquor to a pick-up of 70% and then rolled up. The cotton fabric is then stored for 3 hours at room temperature. The dyed goods are then rinsed, soaped at the boil for ¼ hour with a non-ionic detergent, rinsed once more, and dried.

DYEING PROCEDURE IV 6 parts of the reactive dye obtained in Example 1 are dissolved in 50 parts of water. To this solution are added 50 parts of a solution which contains 16 g/l of sodium hydroxide and 0.1 liter of water glass. A cotton fabric is padded with this liquor to a pick-up of 70% and then rolled up. The cotton fabric is then stored for 10 hours at room temperature. The dyed goods are then rinsed, soaped at the boil for ¼ hour with a non-ionic detergent, rinsed one more, and dried.

DYEING PROCEDURE V 2 parts of the reactive dye obtained in Example 1 are dissolved in 100 parts of water by adding 0.5 part of sodium m-nitrobenzenesulfonate. A cotton fabric is impregnated with this solution to a liquor pick-up of 75% and then dried. The fabric is then impregnated with a warm solution of 20° C. which contains 4 g/l of sodium hydroxide and 300 g/l of sodium chloride, and then expressed to a pick-up of 75%. The deing is steamed for 30 seconds at 100° to 102° C., rinsed, soaped for a quarter of an hour in a 0.3% boiling solution of a non-ionic detergent, rinsed and dried.

PRINTING PROCEDURE 3 parts of the reactive dye employed in Example 1 are sprinkled, with rapid stirring, into 100 parts of a stock thickening which contains 50 parts of 5% sodium alginate thickening, 27.8 parts of water, 20 parts of urea, 1 part of sodium m-nitrobenzenesulfonate and 1.2 parts of sodium hydrogen carbonate. A cotton fabric is printed with the printing paste so obtained and dried. The printed fabric is steamed for 2 minutes at 102° C. in saturated steam, then rinsed, if necessary soaped at the boil, then rinsed once more and subsequently dried.

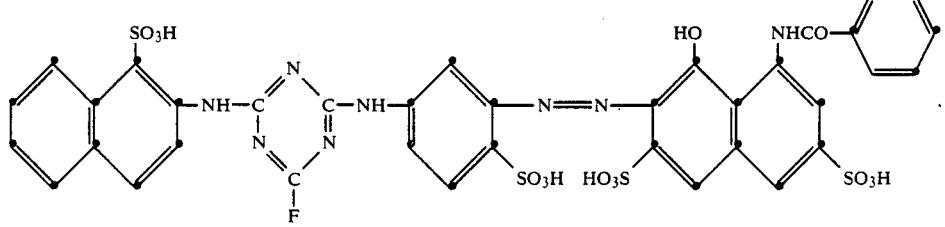

What is claimed is:

1. A reactive dye of the formula

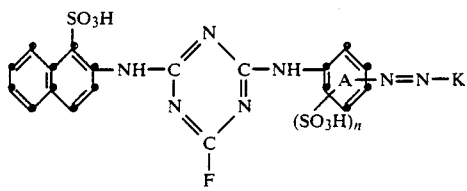

wherein K is a naphtholsulfonic acid or N-acylated aminonaphtholsulfonic acid, n is 1, or 2, and ring A may contain further substituents.

2. A reactive dye of claim 1, wherein K is a hydroxynaphthalenedisulfonic acid or of an N-acylated aminohydroxynaphthalene-mono- or -disulfonic acid.

3. A reactive dye of claim 2, wherein K is an N-acylated 1-amino-8-hydroxynaphthalene-3,6- or -4,6-disulfonic acid.

4. A reactive dye of claim 3, wherein n is 1 and ring A does not contain further substituents.

5. The reactive dye of claim 4 of the formula

6. A reactive dye of claim 1, as a lithium salt or a mixture of a lithium salt with another alkali metal salt.

7. A process for the preparation of a reactive dye of claim 1, which comprises diazotising, coupling and condensing, in suitable order, 2-naphthylamine-1-sulfonic acid, 2,4,6-trifluoro-s-triazine, a phenylenediaminesulfonic acid and a coupling component of the naphtholsulfonic acid or N-acylated aminonaphtholsulfonic acid series.

8. A process of claim 7, wherein the condensation reactions and, if desired, the coupling, are carried out in the presence of at least the equimolar amount of a basic lithium compound.

9. A process of claim 8, wherein the lithium compound is lithium carbonate, lithium hydrogen carbonate or lithium hydroxide.

10. A process of claim 9 for the preparation of a reactive dye of claim 5, which comprises condensing 2-napththylamine-1-sulfonic acid with 2,4,6-trifluoro-s-triazine in the presence of lithium hydroxide, condensing the primary condensation product with 1,3-diaminobenzene-4-sulfonic acid in the presence of lithium hydroxide, diazotising the secondary condensation product, and coupling to 1-benzoylamino-8-hydroxynaphthalene-3,6-disulfonic acid in the presence of lithium hydroxide or sodium hydroxide.

11. A process for dyeing or printing cellulosic fibre material which comprises the step of applying to said material a reactive dye, or a salt thereof, of claim 1.

12. A process of claim 11 for dyeing or printing cotton.

* * * * *